US005602357A

United States Patent [19]

Aoki et al.

[11] Patent Number: 5,602,357

[45] Date of Patent: Feb. 11, 1997

[54] ARRANGEMENT SUPPORT APPARATUS FOR PRODUCTION OF PERFORMANCE DATA BASED ON APPLIED ARRANGEMENT CONDITION

[75] Inventors: Eiichiro Aoki, Hamamatsu; Kazunori Maruyama, Tama, both of Japan

[73] Assignee: Yamaha Corporation, Japan

[21] Appl. No.: 349,082

[22] Filed: Dec. 2, 1994

[51] Int. Cl.[6] ............................ G09B 15/04; G10H 1/36; G10H 1/38

[52] U.S. Cl. ................................ 84/634; 84/636; 84/637; 84/477 R; 84/DIG. 22

[58] Field of Search ..................... 84/609–614, 634–638, 84/DIG. 12, DIG. 22, 477 R, 478

[56] References Cited

U.S. PATENT DOCUMENTS

| | | | |
|---|---|---|---|
| 5,052,267 | 10/1991 | Ino | 84/613 |
| 5,085,118 | 2/1992 | Sekizuka | 84/635 |
| 5,451,709 | 9/1995 | Minamitaka | 84/609 |
| 5,461,190 | 10/1995 | Terada | 84/609 |

FOREIGN PATENT DOCUMENTS 5-273975 10/1993 Japan .

*Primary Examiner*—Stanley J. Witkowski
*Attorney, Agent, or Firm*—Graham & James LLP

[57] ABSTRACT

An arrangement support apparatus for producing automatic accompaniment performance data for a musical tune. The musical tune is divided into a plurality of sections, and an arrangement condition is input for each of the sections. Utilizing the arrangement conditions, the apparatus selects an accompaniment pattern corresponding to at least one accompaniment performance part for each of the sections of the musical tune. The apparatus then produces automatic accompaniment performance data for the musical tune utilizing the selected accompaniment patterns.

9 Claims, 11 Drawing Sheets

Fig. 2

| | INTRODUCTION | SECTION 1 | INTERLUDE 1 | SECTION 2 | INTERLUDE 2 | SECTION 3 | ENDING |
|---|---|---|---|---|---|---|---|
| GENRE | 8 BEAT ROCK | | | | | | |
| NUMBER OF MEASURES | 8 | 16 | 4 | 32 | 4 | 32 | 16 |
| TONALITY | C Major | | | F Major | | C Major | |
| TIME | 4/4 | | | | | | |
| TEMPO | 120 | | | 80 | | 120 | |
| INSTRUMENT-FORMATION | ROCK BAND | | | PIANO & FLUTE | | ROCK BAND | |
| MOTION | RHYTHMIC | | | MELODIC | | RHYTHMIC | |
| DYNAMICS | Forte | Medium | Piano | Medium | Piano | Medium | Medium |
| FILL-IN | | O | X | O | X | O | X |

ARRANGEMENT SUPPORT APPARATUS FOR PRODUCTION OF PERFORMANCE DATA BASED ON APPLIED ARRANGEMENT CONDITION

BACKGROUND OF THE INVENTION

1. Field of the Invention

The present invention relates to an arrangement support apparatus for producing performance data based upon an arrangement condition applied by a user.

2. Description of the Prior Art

There has been proposed an automatic performance apparatus wherein a desired performance pattern is selected by a user from plural kinds of performance patterns preliminarily memorized for automatic accompaniment and is memorized in a progression order of a musical tune. Since the performance patterns are produced on a basis of a predetermined chord, the chord progression is separately memorized by the user in the progression order of the musical tune. In reproduction of the musical tune, performance data of the memorized pattern and a chord of the chord progression are read out in sequence and converted to be suitable for the chord such that accompaniment data are produced to effect automatic accompaniment suitable for the progression of the desired musical tune.

In the case that a large number of performance patterns are memorized, however, it is impossible for the user to memorize all the memorized performance patterns. It takes time to listen to each performance pattern for confirmation thereof. Accordingly, it is very difficult to select a desired performance pattern from the memorized performance patterns. Since the entirety of the musical tune is hard to understand during selection of each performance pattern, determination of a suitable performance pattern itself becomes difficulty.

SUMMARY OF THE INVENTION

It is, therefore, a primary object of the present invention to provide an arrangement support apparatus in which a performance pattern is automatically selected in accordance with an arrangement condition applied by a user on a basis of progression of a musical tune to produce automatic performance data suitable for the musical tune.

According to the present invention, the object is accomplished by providing an arrangement support apparatus which comprises input means arranged to be applied with an arrangement condition corresponding with each of plural formation sections of a musical tune, memory means for memorizing accompaniment pattern data for at least one performance part designation means for designating the memorized accompaniment pattern data based upon the applied arrangement condition, and means for producing performance data based upon the designated accompaniment pattern data.

According to an aspect of the present invention, there is provided an arrangement support apparatus for producing performance data based upon an arrangement condition applied by a user, which support apparatus comprises input means arranged to be applied with an arrangement condition corresponding with each of plural formation sections of a musical tune memory means for memorizing accompaniment pattern data for a plurality of performance parts, selection means for selecting the memorized accompaniment pattern data based upon the applied arrangement condition, and means for producing performance data based upon the selected accompaniment data.

According to another aspect of the present invention, there is provided an arrangement support apparatus for producing performance data based upon an arrangement condition applied by a user, which support apparatus comprises input means arranged to be applied with an arrangement condition corresponding with each of plural formation sections of a musical tune, first memory means for memorizing accompaniment pattern data for a plurality of performance parts, second memory means for memorizing chord progression data, designation means for selectively designating the memorized accompaniment data based upon the applied arrangement condition, and means for producing performance data based upon the designated accompaniment pattern data and the memorized chord progression data.

In a preferred embodiment of the present invention, it is preferable that the arrangement condition is represented by a genre, the number of measures, tonality, time, a tempo, an instrument-formation motion, dynamics and fill-in.

BRIEF DESCRIPTION OF THE DRAWINGS

Other objects, features and advantages of the present invention will be more readily appreciated from the following detailed description of a preferred embodiment thereof when taken together with the accompanying drawings, in which:

FIG. 2 is a view illustrating an image For input of an arrangement condition;

DESCRIPTION OF THE PREFERRED EMBODIMENT

Figure 1:
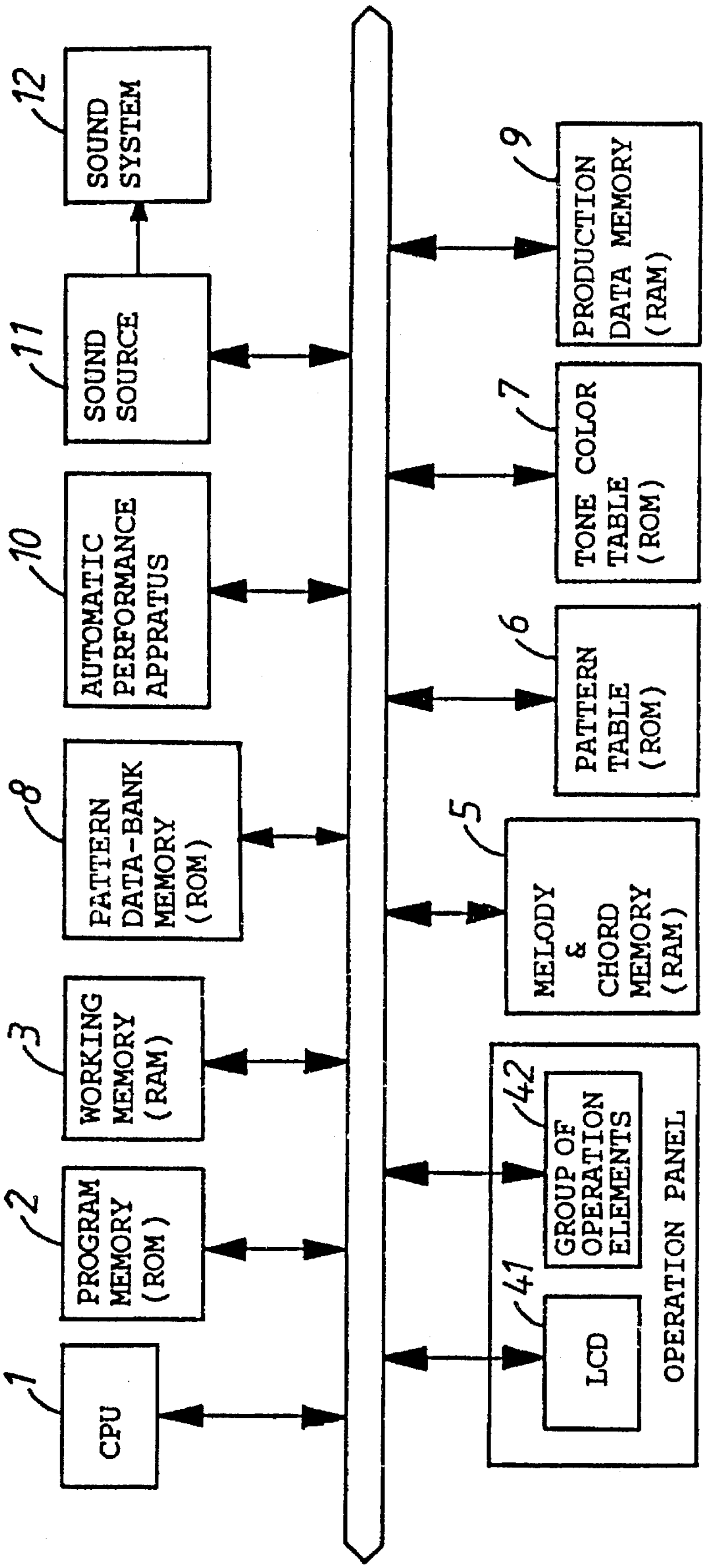
FIG. 1 is a block diagram of an arrangement support apparatus in accordance with the present invention.

In FIG. 1 of the drawings, there is schematically illustrated an electronic musical instrument provided with an arrangement support apparatus according to the present invention. The electronic musical instrument includes a central processing unit or CPU 1 which is arranged to execute a control program memorized in a program memory 2 in the form of a read-only memory or ROM for various control of the electronic musical instrument by using a working memory 3 in the form of a random access memory or RAM. An operation panel 4 of the electronic musical instrument is provided with an LCD indicator 41 and a group of operation elements 42. The group of operation elements 42 is composed of an accompaniment production switch, a start/stop switch, an arrangement condition input switch, a melody input switch, a chord progression input switch, a correction switch, a ten key and a cursor key (not shown). The CPU 1 detects an operation event of the operation elements for processing a signal indicative of the operation event. When a user operates the melody input switch and the chord progression switch while looking the LCD indicator 41 to input melody data and chord progression data, the CPU 1 writes the input melody data and chord progression data into a melody and chord memory 5 in the form of a random access memory or RAM and controls the indicator 41 to indicate the input data thereon. When the user operates the arrangement condition switch to input an arrangement condition and operates the accompaniment production switch to designate an accompaniment production, the CPU 1 reads out an accompaniment pattern number defined by the input arrangement condition from a pattern table 6 in the form of a read-only memory or ROM and reads out accompaniment pattern data corresponding with the accompaniment pattern number from a pattern data bank 8 in the form of a read-only memory or ROM.

The pattern table 6 is designed to memorize accompaniment pattern numbers indicative of a normal pattern corresponding with all combination of genre (8 beat rock, waltz, bossa nova, etc.) time (4/4 time, 3/4 time, etc.), motion (melodic, rhythmic) and dynamics (forte, medium, piano) and a fill-in pattern, respectively for a bass part, a backing part and a drums part. For the bass part and the backing part, the accompaniment pattern data consist of a tone pitch information, a sound timing information and a sound time information of an accompaniment tone. For the drums part, the accompaniment pattern data consist of an instrument-information and a sound timing information of a percussion tone. Thus, the accompaniment data are produced by the accompaniment pattern data in accordance with the melody and chord progression data read out from the melody and chord memory 5. A tone color table 7 in the form of a read-only memory or ROM is provided to memorize a combination of tone color data for the respective performance parts in compliance with an instrument-formation. Thus, the CPU 1 reads out the tone color data of the respective performance parts from the tone color table 7 in accordance with the instrument-formation and writes the tone color data with the accompaniment data into a production data memory 9 in the form of a random access memory or RAM. When the user operates the correction switch to correct the accompaniment data, the CPU 1 adds additional data to the accompaniment data or delete the accompaniment data and indicates an image on the display of LCD indicator in accordance with an input condition of the operation elements.

When the user operates the start/stop switch to designate start or stop of automatic performance, the CPU 1 applies a start or stop signal to the automatic performance apparatus 10. When applied with the start signal, the automatic performance apparatus 10 is activated to start processing for automatic performance. In this instance, the automatic performance apparatus 10 produces a musical tone information for reproduction of the melody part, a counter melody part, the bass part the backing part and the drums part on a basis of the accompaniment data memorized in the production data memory 9 and the melody and chord progression data memorized in the melody and chord memory 5 and applies the musical tone information to a sound source 11. Thus, a musical tone signal indicative of the musical tone information is applied to a sound system 12 from the sound source 11 to be sounded. When applied with the stop signal from the start/stop switch, the automatic performance apparatus 10 ceases the processing for automatic performance, As is understood frcm the above description, accompaniment data suitable for an arrangement condition applied by the user are automatically produced and performed by the automatic performance apparatus 10 in a condition where the accompaniment data can be corrected by the user.

Disclosed in FIG. 2 is an image indicated on the display of LCD indicator 41 when an arrangement condition has been applied by the user. When the user operates the ten key to input the number of formation sections (for instance, three formation sections) prior to input of the arrangement condition, the number of formation sections is indicated on the display of indicator 41 as shown in FIG. 2 so that it is able for the user to input an arrangement condition by using the arrangement condition input switch while looking the display of indicator 41. In the image on the display of indicator 41, the arrangement condition is represented by a genre, the number of measures, tonality, time, a tempo, an instrument-formation, motion, dynamics, fill-in on a vertical line of the image, and the formation section is represented by introduction, sections 1–3, interludes 1, 2 and an ending on a transverse line of the image. The user operates the cursor key to move a cursor for selecting an input column and operates the arrangement input switch to selectively input an arrangement condition. In this instance, blank columns in the image are applied with the same arrangement condition as those in the left-hand columns and a fill-in pattern for each number of measures is entered into the formation section where "fill-in" is present in the arrangement condition. Since the "fill-in" may not be entered into the introduction, there is not any input in the fill-in column of the introduction. In case the introduction interludes and ending are not required, the user operates the arrangement input switch to input "0" into the column of the number of measures in the corresponding formation section. Thus, the arrangement condition is set for each of the formation sections.

Figure 3:
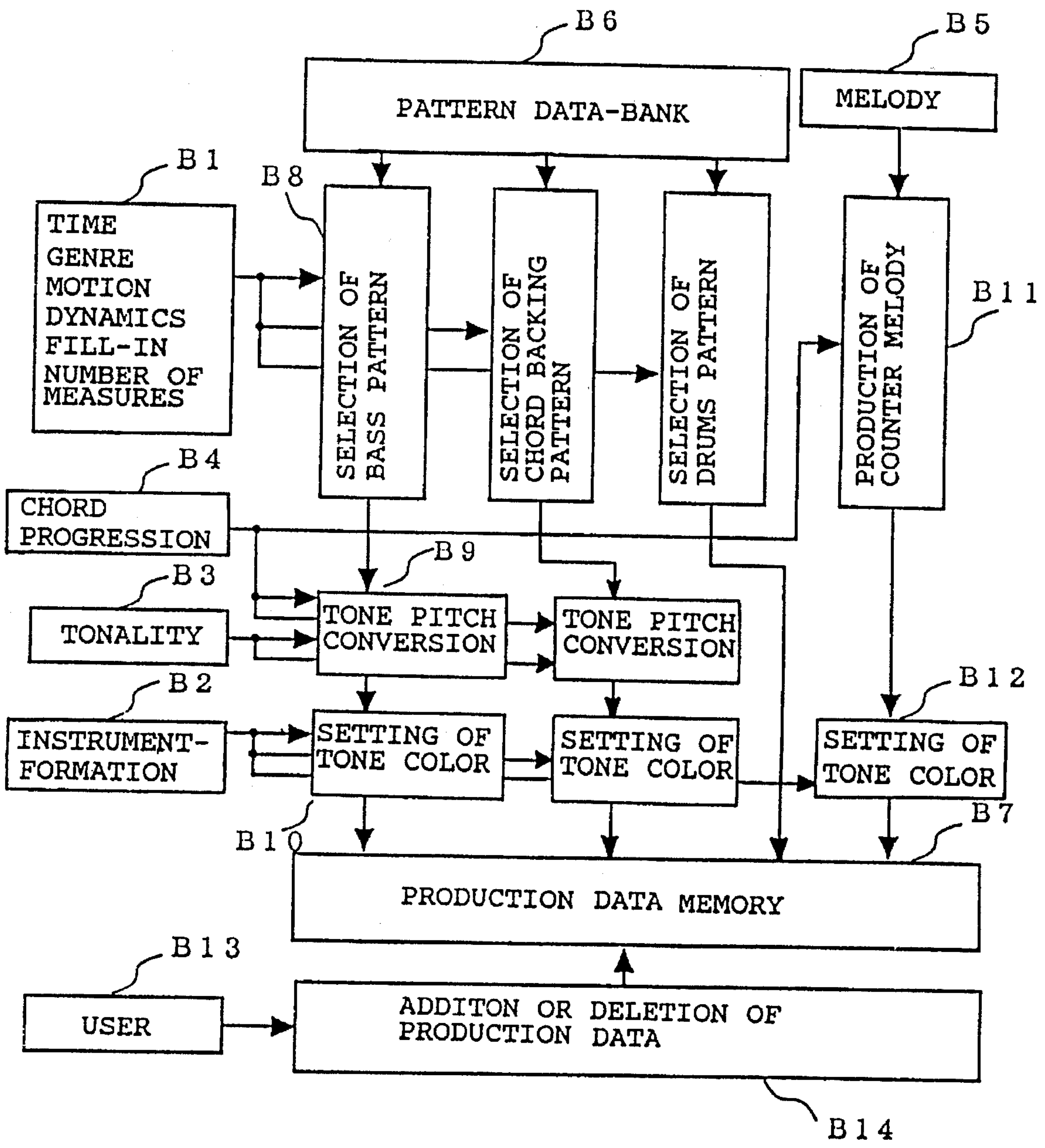
FIG. 3 is a concept view of processing for production of an accompaniment.

In FIG. 3 there is schematically illustrated a production process of the accompaniment data, wherein blocks B1–B3 represent the arrangement condition applied by the user, blocks B4, B5 represent the chord progression and melody data memorized in the melody/chord memory 5, a block B6 represents the pattern data bank 8, and a block B7 represents the production data memory 9. In the production process of the accompaniment data, a bass pattern is first selected from the pattern data bank 8 at block B8 in accordance with time genre, time, motion, dynamics, and fill-in of the arrangement condition. The selected bass pattern is converted in tone pitch on a basis of the chord and tonality (B3) at a block B9. Subsequently, tone color data corresponding with an instrument-formation are set at a block B10 and memorized together with the converted bass pattern in the production data memory 9 at a block B7. The processing at blocks B8–B10 is conducted in accordance with the number of measures for each of the formation sections. Thus, the accompaniment data for the bass part are produced and memorized in the production data memory 9 at block B7. The accompaniment data for the backing and drums parts are produced and memorized in the production data memory 9 in the same manner as described above. In the processing of the accompaniment data for the drums part, however, there is not any processing for tone pitch conversion and for determination of the tone color. A counter-melody part is produced on a basis of the melody (B5), the chord progression (B4) and the tonality (B3). The tone color data corresponding with the instrument-formation are set at a block B12 and memorized together with the produced accompaniment data for the counter-melody part in the production data memory 9 at block B7. Although the accompaniment data for the respective performance parts are produced and memorized as described above, the memorized accompaniment data can be deleted or provided with additional data by the user at block B13.

Figure 4:
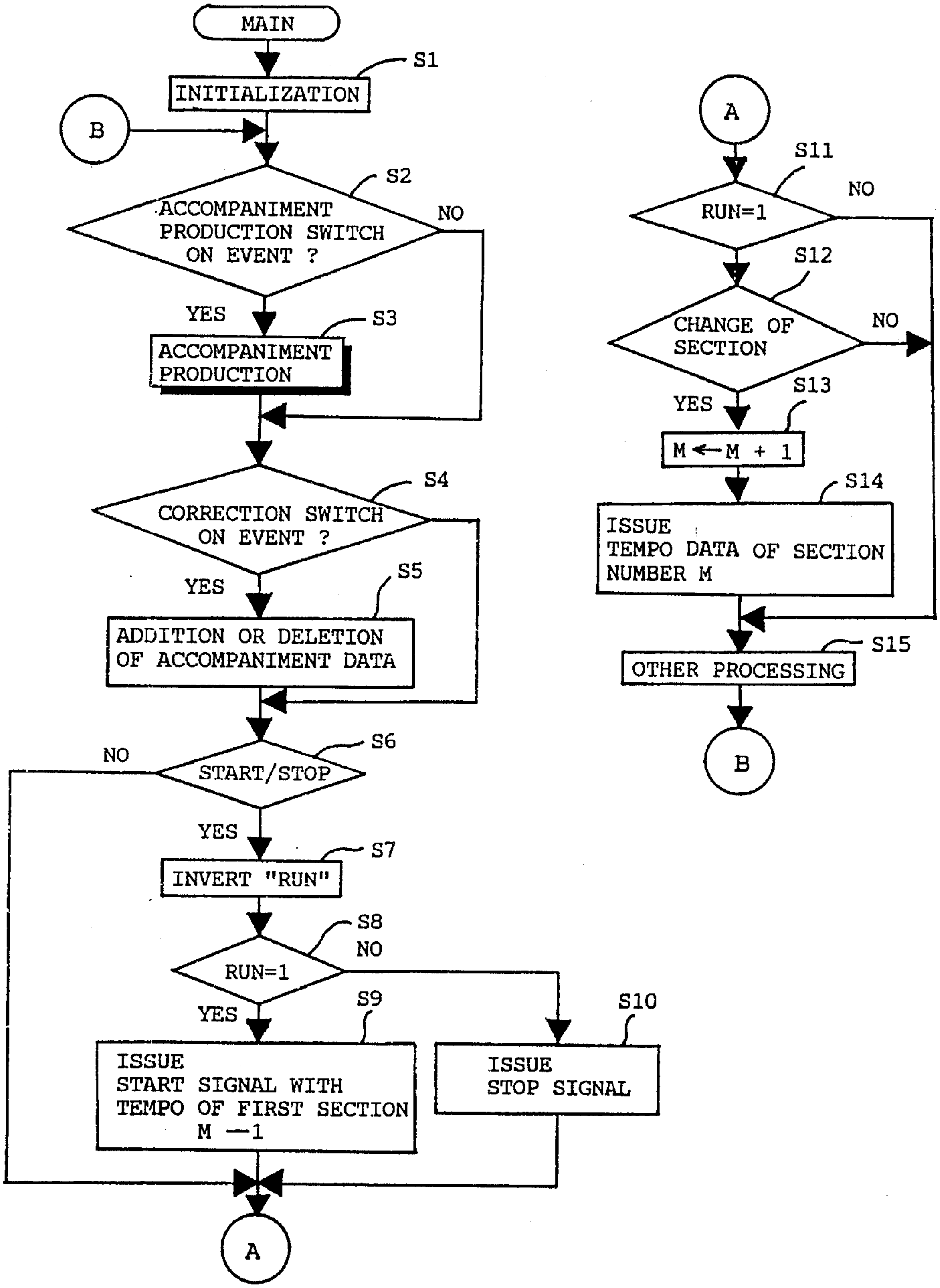
FIG. 4 is a flow chart of a main routine executed by a central processing unit shown in FIG. 1.

In FIG. 4, there is illustrated a main routine of a control program of the electronic musical instrument. In FIGS. 5 to 8, there are illustrated sub-routines of the control program. Assuming that the CPU 1 has been activated to start execution of the main routine, the CPU 1 initializes flags and registers at step S1 and determines at step S2 whether an on-event of the accompaniment production switch is present or not. If the answer at step S2 is "No", the program proceeds to step S4. If the answer at step S2 is "Yes", the program proceeds to step S3 where the CPU 1 executes processing of a sub-routine for production of accompaniment data as will be described later. Thus, the CPU 1 memorizes the produced accompaniment data in the production data memory 9 and causes the program to proceed to step S4. At step S4, the CPU 1 determines whether an on-event of the correction switch is present or not. If the answer at step S4 is "No", the program proceeds to step S6. If the answer at step S4 is "Yes", the program proceeds to step S5 where the CPU 1 deletes the memorized accompaniment data or adds additional data to the memorized accompaniment data. In this instance, the memorized accompaniment data are indicated on the display of LCD indicator 41 by operation of the user. It is, therefore, able for the user to delete the accompaniment data or add the additional data while looking the LCD indicator 41. In operation of the LCD indicator 41, deletion of the accompaniment data or addition of the additional data may be conducted for each data unit, a note unit or a pattern unit. In addition, the additional data, note or pattern may be directly numbered by the user.

Subsequently, the program proceeds to step S6 where the CPU 1 determines whether an on-event of the start/stop switch is present or not. If the answer at step S6 is "No", the program proceeds to step S11. If the answer at step S6 is "Yes", the CPU 1 inverts a flag RUN at step S7 and determines at step S8 whether the flag RUN is "1" or not. When the start of the automatic performance is designated, the CPU 1 determines a "Yes" answer at step S8 and causes the program to proceed to step S9 where the CPU 1 issues a start signal for automatic performance and applies the start signal together with tempo data of a first formation section to the automatic performance apparatus 10. In this instance, the CPU 1 sets a register M as "1" and causes the program to proceed to step S11. When applied with the start signal, the automatic performance apparatus 10 is activated to start automatic performance on a basis of the melody and chord progression data memorized in the melody and chord memory 5 and the accompaniment data memorized in the production data memory 9 and to effect the automatic performance at a tempo defined by the tempo data.

When the stop of the automatic performance is designated, the CPU 1 determines a "No" answer at step S8 and causes the program to proceed to step S10 where the CPU 1 applies a stop signal to the automatic performance apparatus 10 and causes the program to proceed to step S11. When applied with the stop signal, the automatic performance apparatus 10 is deactivated. At step S11, the CPU 1 determines whether the flag RUN is "1" or not. If the answer at step S11 is "No", the program proceeds to step S15. If the answer at step S11 is "Yes", the program proceeds to step S12 where the CPU 1 determines whether the formation section of the musical tune has changed or not. If the answer at step S12 is "No", the program proceeds to step S15. If the answer at step S12 is "Yes", the program proceeds to step S13 where the CPU 1 adds "1" to the value of the register M (indicative of the formation section number). causes the program to proceed to step S14. At step 14, the CPU 1 reads out tempo data defined by an arrangement condition of a formation section of the number M corresponding with the numerical value memorized in the register M and applies the tempo data to the automatic performance apparatus 10. The setting process of the arrangement condition will be described in detail later. When the program proceeds to step S15, the CPU 1 executes other processing and returns the program to step S2 for repetition of processing at steps S2 to S15. Thus, each tempo of the formation sections for reproduction of the automatic performance is automatically set.

Figure 5:
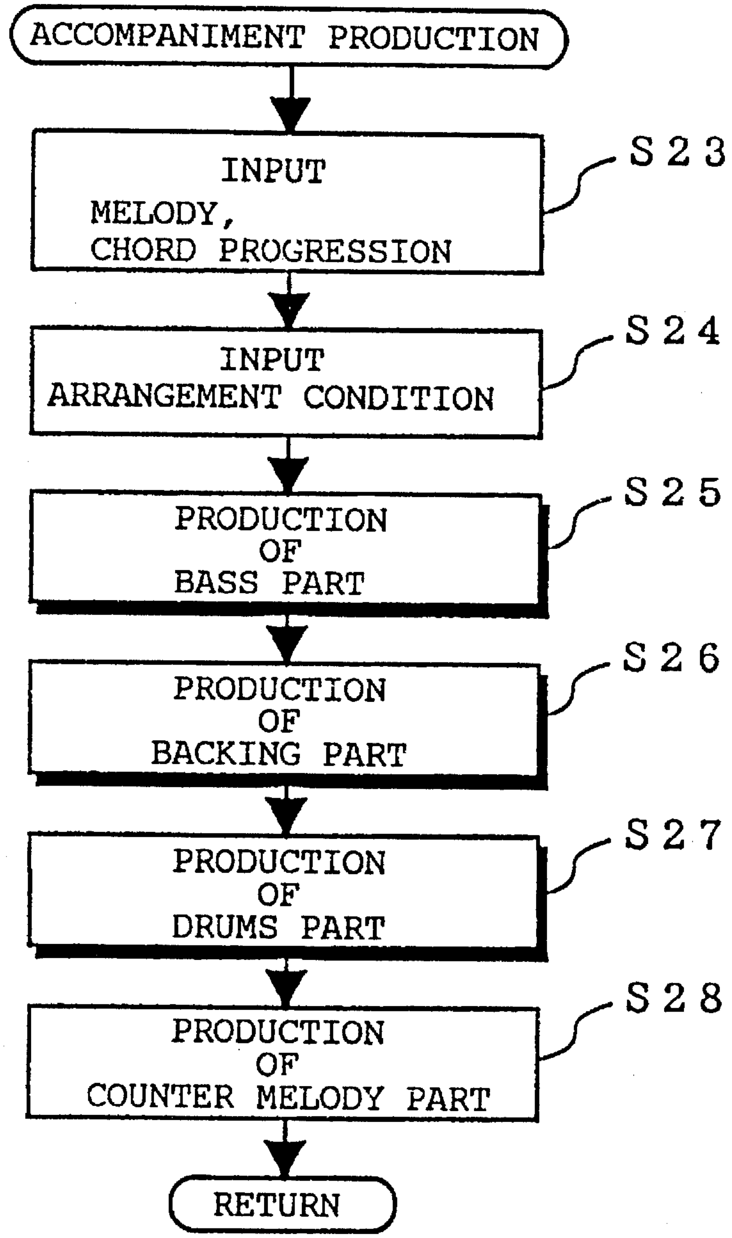
FIG. 5 is a flow chart of processing for production of the accompaniment.

In FIG. 5 there is illustrated a production process of the accompaniment data. At step S23, the CPU 1 executes input processing of melody and chord progression data for a musical tune. In this instance, the user operates the melody input switch and the chord progression switch to input the melody and chord progression data and memorizes the input data in the melody and chord memory 5. At the following step S24, the CPU 1 executes input processing of an arrangement condition. In this instance, the arrangement condition is set for each of the formation sections as described above.

Subsequently, accompaniment data are automatically produced by processing at step S25 to S28. Although the concept for production process of the accompaniment data has been described above, a practical process for production of the accompaniment data will be described hereinafter. When the program proceeds to step S25, the CPU 1 executes processing for production of a bass part on a basis of the input arrangement condition as shown by a flow chart in FIG. 6. At the following step S26, the CPU 1 executes processing for production of a backing part as shown by a flow chart in FIG. 7. When the program proceeds to step S27, the CPU 1 executes processing for production of a drums part as shown by a flow chart in FIG. 8 and causes the program to proceed to step S28 where the CPU 1 executes processing for production of a counter melody part and returns the program to the main routine. At step 28, performance data for the counter melody part are produced on a basis of melody data read out from the melody and chord memory 5 and chord progression data corresponding with each sound timing of the melody data.

Figure 6:
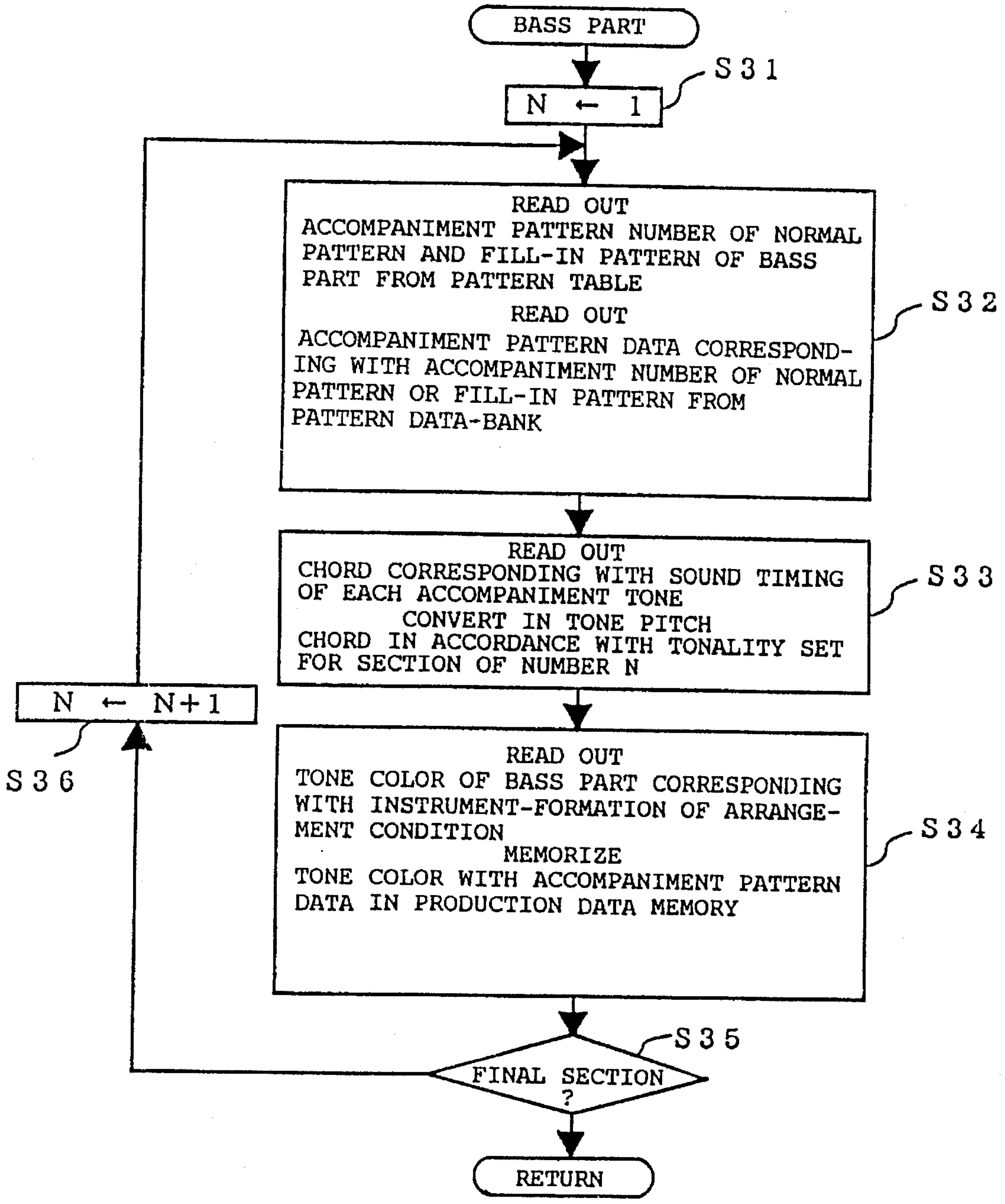
FIG. 6 is a flow chart of processing for production of a bass part.

Hereinafter, the production process of the bass part will be described with reference to FIG. 6. When the program proceeds to step S31, the CPU 1 sets a register N as "1" and causes the program to proceed to step S32. At step S32, the CPU 1 reads out an accompaniment pattern number of both a normal pattern and a fill-in pattern of the bass part from the pattern table 6 on a basis of an arrangement condition (a genre, time, motion, dynamics) of a formation section corresponding with a numerical value memorized in the register N. Additionally, the CPU 1 reads out accompaniment pattern data corresponding with the accompaniment number of the normal pattern or fill-in pattern from the pattern data bank 8. In this instance, the CPU 1 repeatedly reads out the accompaniment pattern data corresponding with the number of measures in the formation section and memorizes the accompaniment pattern data in a buffer (not shown). The selection of the normal pattern or the fill-in pattern is conducted in accordance with presence or absence of the fill-in in the formation section. If the fill-in is present in the formation section, the CPU 1 selects a fill-in pattern respectively for four measures and selects a normal pattern for other measures. If the fill-in is absent in the formation section, the CPU 1 always selects a normal pattern. At the following step S33, the CPU 1 reads out a chord corresponding with each sound timing of the memorized accompaniment tones from the memorized chord progression data and converts each tone pitch of the accompaniment tones into a tone pitch suitable for the corresponding chord. Thereafter, the CPU 1 further converts the tone pitch in accordance with a tonality of the arrangement condition for the formation section of the number N and memorizes the converted tone pitch in the buffer.

When the program proceeds to step S34, the CPU 1 reads out tone color data corresponding with an instrument-formation of the arrangement condition for the formation section from the tone color table 7 and writes the tone color data together with the memorized accompaniment data into the production data memory 9. If the formation section is a second formation section or the following formation section, the tone color data and accompaniment pattern data are memorized in connection with the accompaniment pattern data of the formation section of the number N–1. When the program proceeds to step S35 after processing at step S34, the CPU 1 determines whether the formation section of the number N is a final section or not. If the answer at step S35 is "No", the CPU 1 adds "1" to the register N and returns the program to step S32. If the answer at step S35 is "Yes", the CPU 1 returns the program to the main routine.

Figure 7:
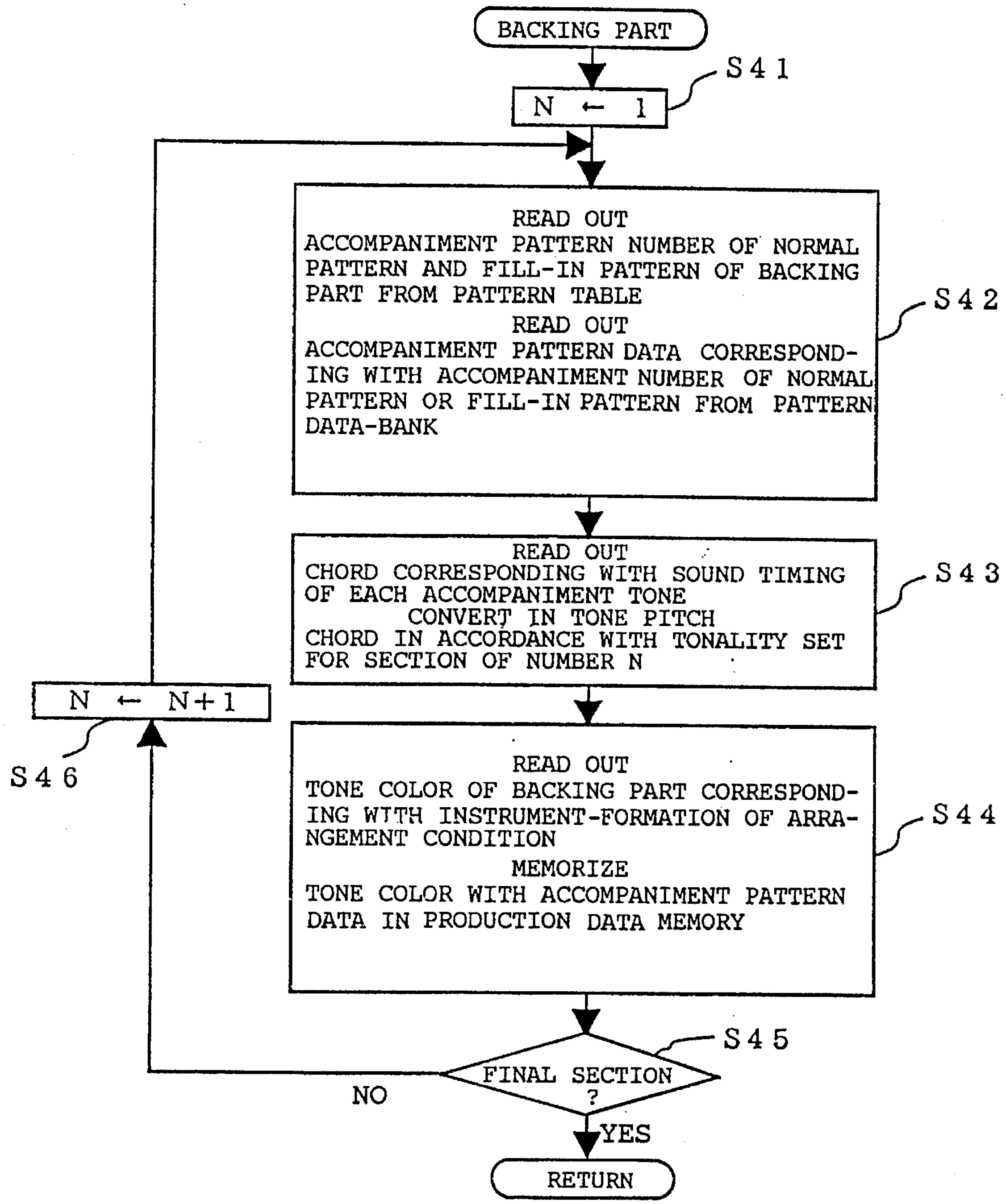
FIG. 7 is a flow chart of processing for production of a backing part.

In FIG. 7 there is illustrated a production process of the backing part which is substantially the same as the production process of the bass part. Processing at step S41 to S46 corresponds with the processing at step S31 to S36.

Figure 8:
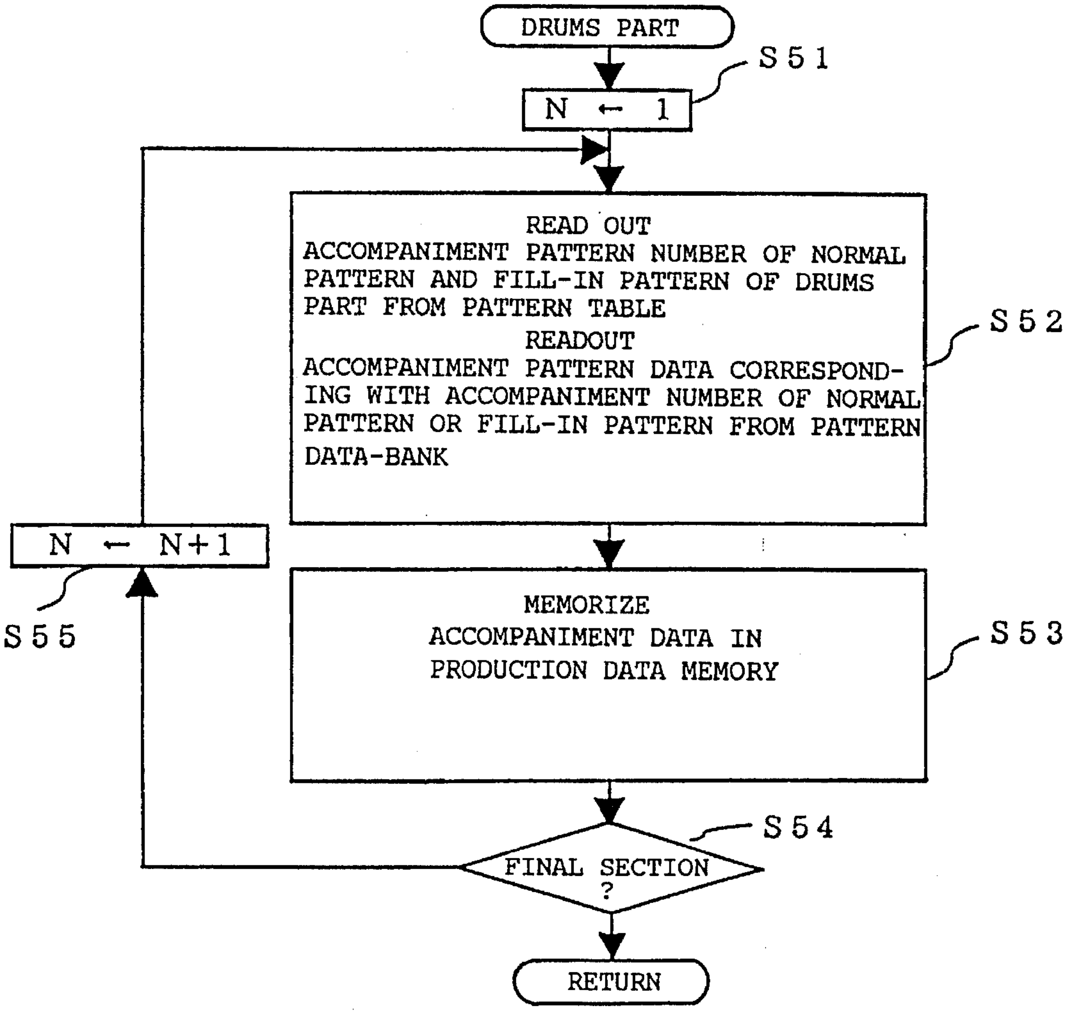
FIG. 8 is a flow chart of processing for production of a drums part.

In FIG. 8 there is illustrated a production process of the drums part wherein the CPU 1 sets the register N as "1" at step S51 and reads out at step S52 an accompaniment pattern number of both a normal pattern and a fill-in pattern of the drums part from the pattern table 6 on a basis of an arrangement condition (a genre, time, motion, dynamics) for a formation section of the number N. Additionally, the CPU 1 reads out at step S52 accompaniment pattern data corresponding with the accompaniment number of the normal pattern or fill-in pattern from the pattern data bank 8. In this instance, the CPU 1 repeatedly reads out the accompaniment pattern data corresponding with the number of measures in the formation section and memorizes the accompaniment pattern data in the buffer. The selection of the normal pattern or the fill-in pattern is conducted in the same manner as in the production process of the bass part. At step S53, the CPU 1 writes the accompaniment pattern data into the production data memory 9. If the formation section is a second formation section or the following formation section, the accompaniment pattern data are memorized in connection with the accompaniment pattern data of the formation section of the number N–1. When the program proceeds to step S54, the CPU 1 determines whether the formation section of the number N is a final section or not. If the answer at step S54 is "No", the CPU 1 adds "1" to the register N and returns the program to step S52. If the answer at step S54 is "Yes", the CPU 1 returns the program to the main routine.

Figure 9:
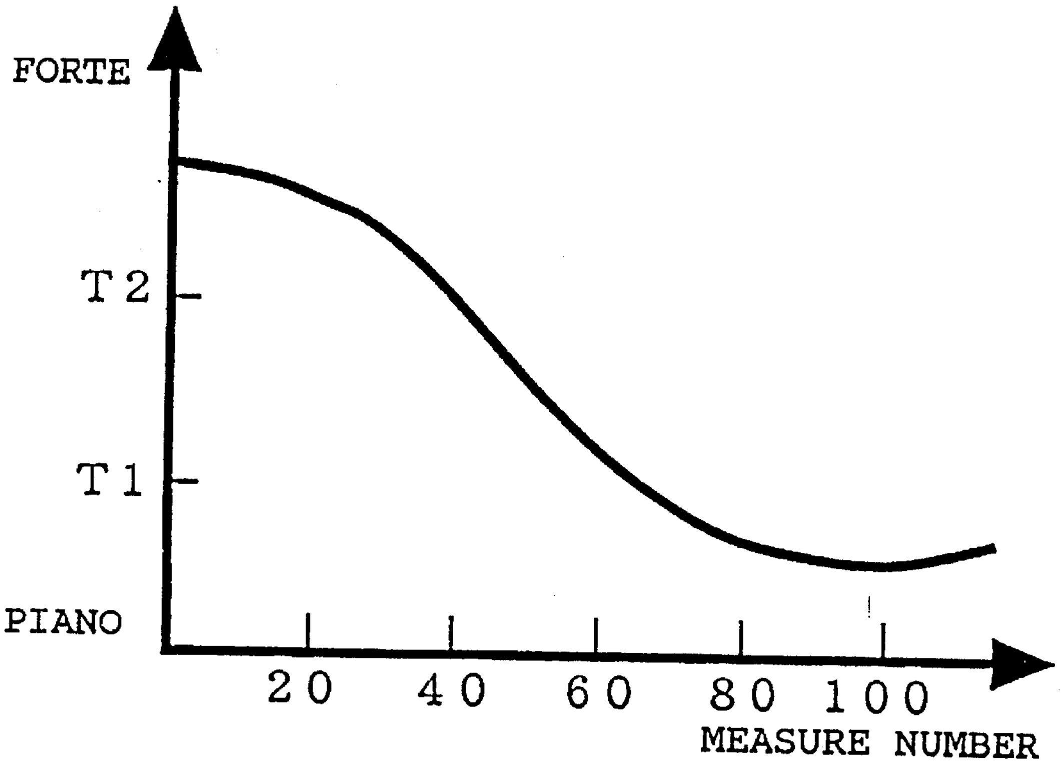
FIG. 9 is a view illustrating an image for input of dynamics in the arrangement condition.
Figure 10:
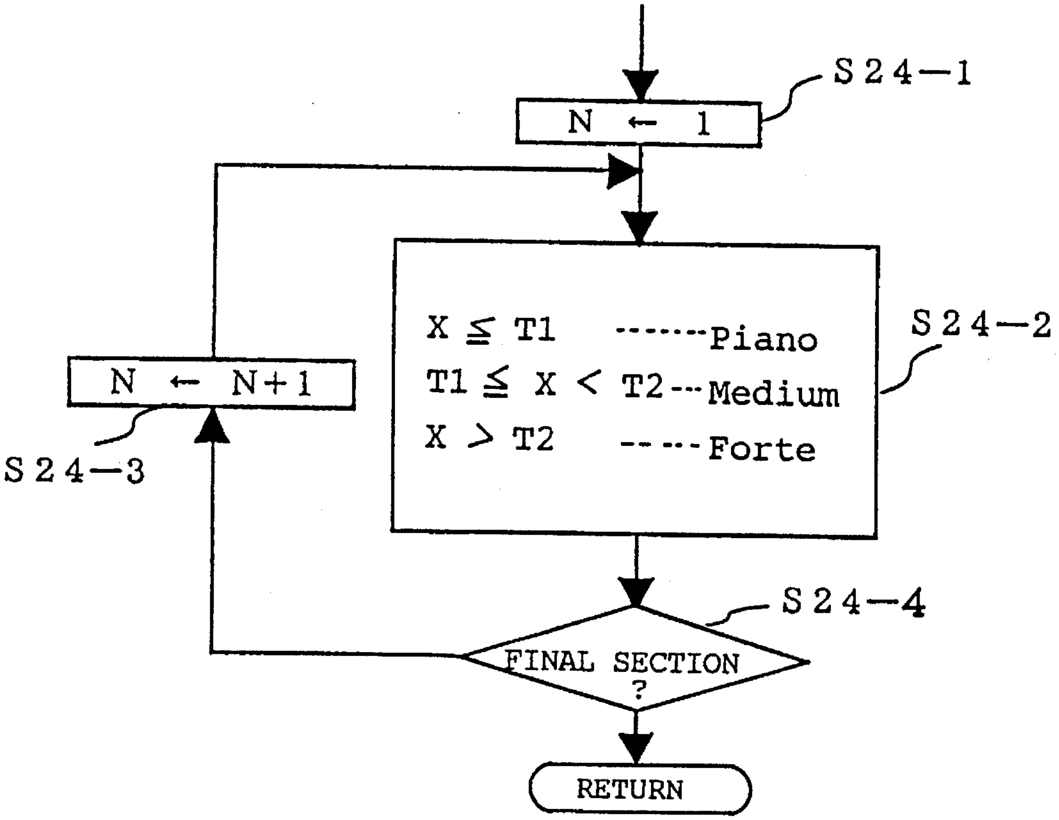
FIG. 10 is a flow chart of other processing for production of the accompaniment.

Although in the above embodiment the dynamics has been determined for each of the formation sections, the determination of the dynamics is sensuous and unintelligible to the user. If the formation section changed, the tone volume would be suddenly changed. It is, therefore, preferable that the dynamics can be graphically set by the user. In FIG. 9, there is illustrated a graph indicated on the display of the LCD indicator 41 for input of the dynamics, wherein the dynamics is indicated on a vertical line, and the measure numbers are indicated on a transverse line. In this case, the user moves the cursor by using a mouth included in the group of operation elements 42 to indicate a point on the graph for input of time variation of the dynamics. Thus, the CPU 1 executes processing at step S24-1 to S24-4 shown in FIG. 10 for setting the dynamics of the respective formation sections.

The execution at step S24-1 to S24-4 is conducted between step S24 and S25 shown in FIG. 5. At step S24-1, the CPU 1 sets the register N as "1" and causes the program to proceed to step S24-2 where the CPU 1 compares an input value X of the dynamics set for the first measure head of the formation section of the number N with threshold values T1, T2 (T1<T2). If the input value X is less than the threshold value T1, the CPU 1 sets the dynamics as "Piano". If the input value X is more than or equal to the threshold value T1 and less than the threshold valve T2, the CPU 1 sets the dynamics as "Medium". If the input value X is more than the threshold value T2, the CPU 1 sets the dynamics as "Forte". At the following step S24-4, the CPU 1 determines whether the formation section of the number N is a final section or not. If the answer at step S24-4 is "No", the CPU 1 adds "1" to the register N at step S24-3 and returns the program to step S24-2. If the answer at step S24-4 is "Yes", the CPU 1 causes the program to proceed to step S25 shown in FIG. 5. Although in the foregoing process the input value set in the first measure head of the formation section has been converted into the dynamics such as "Forte", "Medium" or "Piano", an input value at an intermediate point of the formation section or an average value of the input value may be converted into the dynamics.

Figure 11:
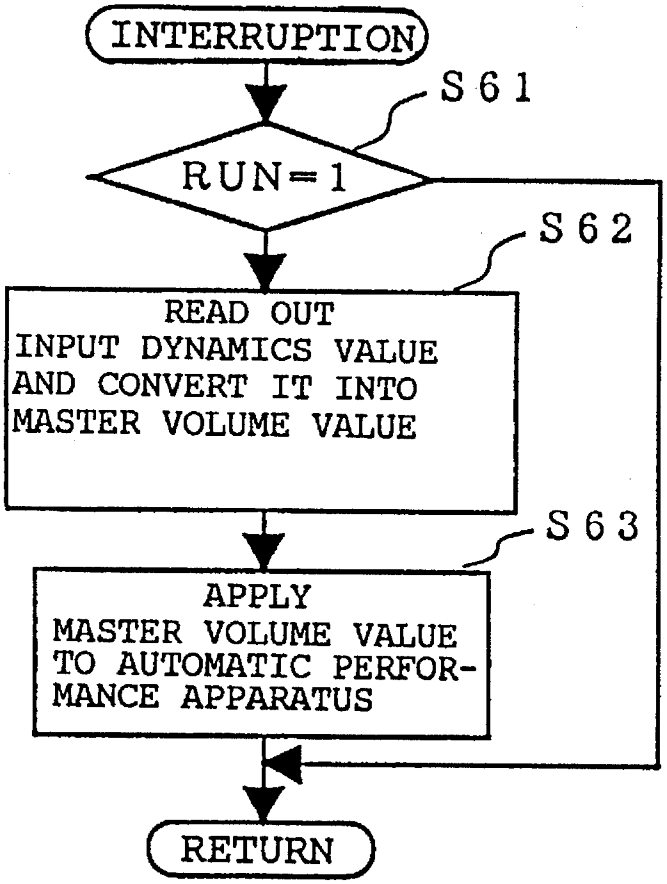
FIG. 11 is a flow chart of an interruption routine executed by the central processing unit shown in FIG. 1.

The dynamics is adapted to control a sound volume of the automatic performance by execution of an interruption processing shown in FIG. 11. The interruption processing is conducted synchronously with the automatic performance at each quarter-note length. At step S61, the CPU 1 determines whether the flag RUN is "1" or not, e.g. whether the current automatic performance is reproduced or not. If the automatic performance is not reproduced (RUN=0), the program returns to the main routine. If the automatic performance is being reproduced (RUN=1), the CPU 1 reads out the input dynamics value corresponding with a time position of the current automatic performance and converts the dynamics value into a master volume value in a usual manner. At the following step S63, the CPU 1 applies the master volume value to the automatic performance apparatus and returns the program to the main routine.

With such execution of the interruption processing, the dynamics of the arrangement condition can be input intelligibly to the user since it is visually indicated as shown in FIG. 9. Thus, it is able in a simple manner to effect delicate variation of the sound volume of the automatic performance.

Although in the above embodiment the fill-in pattern has been entered into the accompaniment data once each at four measures when the fill-in has been set in the arrangement condition the fill-in pattern may be set once each at eight measures or an appropriate frequency. Although the accompaniment pattern data have been preliminarily memorized in the pattern data bank 8, the pattern data bank 8 may be provided in the form of a random access memory in such a manner that an appropriate pattern can be memorized by operation of the user.

What is claimed is:

1. An apparatus for producing accompaniment performance data for a musical tune comprising:

input means for inputting an arrangement condition for each of a plurality of sections of said musical tune, each said input arrangement condition indicating at least one characteristic of each of said plurality of sections for which said arrangement condition is input;

memory means for storing a plurality of accompaniment patterns;

designation means for designating one of said stored accompaniment patterns for each one of said plurality of sections based upon the respective input arrangement condition for each of said plurality of sections; and means for producing accompaniment performance data for said musical tune utilizing said accompaniment patterns designated by said designating means.

2. An apparatus as recited in claim 1 further comprising means for editing said accompaniment performance data produced by said producing means.

3. An apparatus as recited in claim 1 further comprising display means for graphically displaying at least one of said plurality of sections and said arrangement condition input therefor.

4. An apparatus as recited in claim 1, wherein said at least one characteristic indicated by each said arrangement condition includes genre, length in measures, tonality, time, tempo, instrument-formation, motion, dynamics and fill-in.

5. An apparatus as recited in claim 1, wherein each one of said arrangement conditions includes a length parameter indicating a length of a respective one of said plurality of sections.

6. An apparatus as recited in claim 5, wherein said producing means produces said accompaniment performance data in accordance with said length parameters of said plurality of arrangement conditions.

7. An apparatus for producing accompaniment performance data for a musical tune comprising:

input means for inputting an arrangement condition for each of a plurality of sections of said musical tune, each said arrangement condition indicating at least one characteristic of each of said plurality of sections for which said arrangement condition is input;

memory means for storing a plurality of accompaniment patterns for each of a plurality of accompaniment parts;

selection means for selecting, for each of said plurality of sections, one of said plurality of stored accompaniment patterns for each of said plurality of accompaniment parts, each said selection being based upon the respective input arrangement condition for each of said plurality of sections; and means for producing accompaniment performance data for said musical tune utilizing said accompaniment patterns selected by said selecting means.

8. An apparatus as recited in claim 7, wherein said plurality of accompaniment parts include a bass part and a percussion part.

9. An apparatus for producing accompaniment performance data for a musical tune comprising:

input means for inputting an arrangement condition for each of a plurality of sections of said musical tune, each said arrangement condition indicating at least one characteristic of each of said plurality of sections for which said arrangement condition is input;

first memory means for storing a plurality of accompaniment patterns;

second memory means for storing chord progression data corresponding to each of said plurality of sections;

designation means for designating one of said stored accompaniment patterns for each of said plurality of sections based upon said arrangement condition for each of said plurality of sections; and means for producing accompaniment performance data utilizing said accompaniment patterns designated by said designating means and said stored chord progression data.

* * * * *